(12) United States Patent
Takeda et al.

(10) Patent No.: US 11,650,589 B2
(45) Date of Patent: May 16, 2023

(54) MANAGEMENT SYSTEM FOR WORK VEHICLE AND MANAGEMENT METHOD FOR WORK VEHICLE

(71) Applicant: Komatsu Ltd., Tokyo (JP)

(72) Inventors: Koji Takeda, Tokyo (JP); Akiharu Nishijima, Tokyo (JP)

(73) Assignee: KOMATSU LTD., Tokyo (JP)

( * ) Notice: Subject to any disclaimer, the term of this patent is extended or adjusted under 35 U.S.C. 154(b) by 624 days.

(21) Appl. No.: 16/316,676

(22) PCT Filed: Sep. 21, 2017

(86) PCT No.: PCT/JP2017/034162
§ 371 (c)(1),
(2) Date: Jan. 10, 2019

(87) PCT Pub. No.: WO2018/056376
PCT Pub. Date: Mar. 29, 2018

(65) Prior Publication Data
US 2019/0163192 A1    May 30, 2019

(30) Foreign Application Priority Data

Sep. 23, 2016 (JP) .............................. JP2016-186326

(51) Int. Cl.
*G05D 1/02* (2020.01)
*G01C 21/34* (2006.01)
(Continued)

(52) U.S. Cl.
CPC .............. *G05D 1/0214* (2013.01); *B60P 1/04* (2013.01); *E02F 1/00* (2013.01); *G01C 21/20* (2013.01);
(Continued)

(58) Field of Classification Search
USPC .......................................................... 701/25
See application file for complete search history.

(56) References Cited

U.S. PATENT DOCUMENTS 5,806,016 A     9/1998 Henderson et al.
6,863,351 B2    3/2005 Baker et al.
(Continued)

FOREIGN PATENT DOCUMENTS

CA    2938940 A1    9/2015
CA    2893194 A1    1/2016
(Continued)

OTHER PUBLICATIONS

"Kawamata Yukihiro, Vehicle travel control system and control server, Oct. 8, 2015" (Year: 2015).*
(Continued)

*Primary Examiner* — James M McPherson
*Assistant Examiner* — Bakari Underwood
(74) *Attorney, Agent, or Firm* — Locke Lord LLP

(57) ABSTRACT

A management system for a work vehicle, includes: a traveling condition data generation unit configured to generate traveling condition data that causes a work vehicle to enter with forward movement, from an entrance of a workplace to a work point of the workplace, and exit with backward movement, from the work point to an exit of the workplace; and an output unit configured to output the traveling condition data to the work vehicle.

5 Claims, 11 Drawing Sheets

(51) Int. Cl.
  *G01C 21/20* (2006.01)
  *E02F 1/00* (2006.01)
  *B60P 1/04* (2006.01)
  *B60P 1/16* (2006.01)

(52) U.S. Cl.
  CPC ............... *G01C 21/34* (2013.01); *G05D 1/02* (2013.01); *G05D 1/0289* (2013.01); *B60P 1/16* (2013.01); *G05D 2201/0202* (2013.01)

(56) References Cited

U.S. PATENT DOCUMENTS

| | | | |
|---|---|---|---|
| 8,386,110 B2 | 2/2013 | Maekawa et al. | |
| 9,037,338 B2 | 5/2015 | Osagawa et al. | |
| 9,704,304 B2 | 7/2017 | Asada et al. | |
| 9,783,041 B2 | 10/2017 | Uranaka et al. | |
| 2004/0158355 A1* | 8/2004 | Holmqvist | G05D 1/0274 700/245 |
| 2013/0325208 A1* | 12/2013 | Osagawa | G05D 1/0212 701/25 |
| 2018/0284787 A1* | 10/2018 | Naka | G08G 1/00 |

FOREIGN PATENT DOCUMENTS

| | | | | |
|---|---|---|---|---|
| JP | 63-155307 A | 6/1988 | | |
| JP | 10-038598 A | 2/1998 | | |
| JP | 2005-292915 A | 10/2005 | | |
| JP | 2010-073080 A | 4/2010 | | |
| JP | 2012-113429 A | 6/2012 | | |
| JP | 2016-153987 A | 8/2016 | | |
| WO | 2015/076420 A1 | 5/2015 | | |
| WO | 2015/129013 A1 | 9/2015 | | |
| WO | WO-2015151359 A1 * | 10/2015 | ............ | E02F 9/2054 |
| WO | 2016/051526 A1 | 4/2016 | | |

OTHER PUBLICATIONS

International Search Report dated Nov. 7, 2017, issued for PCT/JP2017/034162.
Office Action dated Nov. 8, 2020, issued for the corresponding Australian patent application No. 2017332940.
Office Action dated Apr. 8, 2020, issued in the corresponding Canadian patent application No. 3,031,203.

* cited by examiner

MANAGEMENT SYSTEM FOR WORK VEHICLE AND MANAGEMENT METHOD FOR WORK VEHICLE

FIELD

The present invention relates to a management system for a work vehicle and a management method for a work vehicle.

BACKGROUND

In a wide-area work site like a mine, a work vehicle traveling unmanned is used for transportation work.

After a load is loaded at a loading place, the work vehicle travels on a conveying path to move to a discharging place and discharges the load at the discharging place. Patent Literature 1 discloses a technique in which a work vehicle switches back at a switchback point of a loading place and moves to a loading point.

CITATION LIST

Patent Literature

Patent Literature 1: Japanese Patent Application Laid-Open No. 2012-113429

SUMMARY

Technical Problem

If switchback operation of a work vehicle can be omitted, the cycle time of the work vehicle is shortened, and productivity of a work site is improved. Therefore, a technique capable of omitting the switchback operation of the work vehicle has been desired.

An aspect of the present invention is to provide a management system for a work vehicle and a management method for a work vehicle capable of improving the productivity of the work site.

Solution to Problem

Advantageous Effects of Invention

According to an aspect of the present invention, there is provided a management system for a work vehicle and a management method for a work vehicle capable of improving productivity of a work site.

DESCRIPTION OF EMBODIMENTS

Hereinafter, an embodiment of the present invention will be described with reference to the drawings; however, the present invention is not limited thereto. The constituent elements of the embodiment described below can be appropriately combined. In addition, some constituent elements may not be used.

[Management System]

Figure 1:
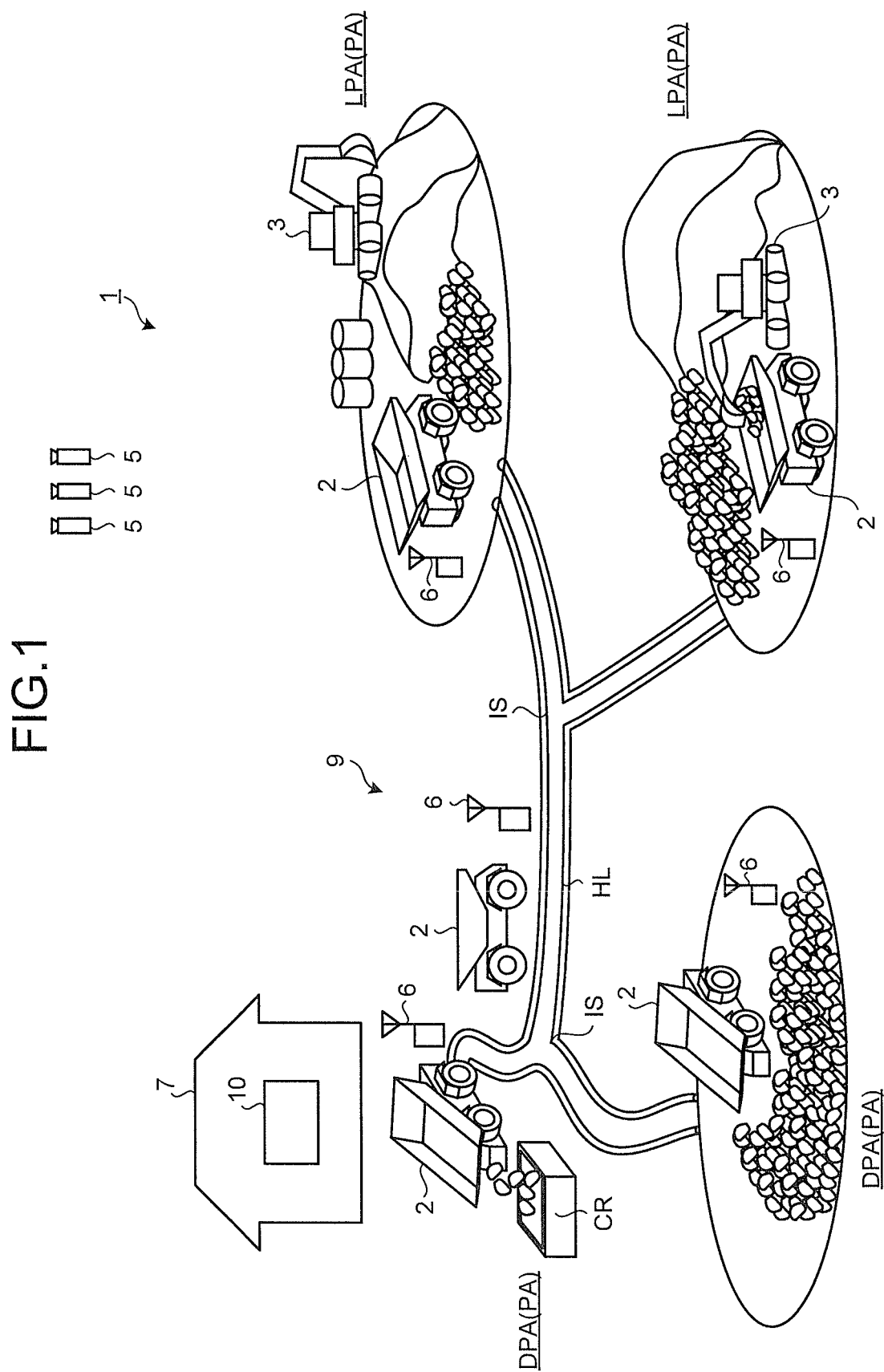
FIG. 1 is a diagram schematically illustrating one example of a management system for a work vehicle according to an embodiment.

FIG. 1 is a diagram schematically illustrating one example of a management system 1 for a work vehicle 2 according to an embodiment. The management system 1 implements operation management of the work vehicle 2. In the present embodiment, the work vehicle 2 is a dump truck 2 that is a transport vehicle capable of traveling through a mine.

As illustrated in FIG. 1, the dump truck 2 travels in at least a part of a mine workplace PA and a conveying path HL leading to the workplace PA. The workplace PA includes at least one of a loading place LPA and a discharging place DPA. The conveying path HL includes an intersection IS. The dump truck 2 travels according to a target traveling route set in the conveying path HL and the workplace PA.

The loading place LPA is an area where a loading operation of loading a load onto the dump truck 2 is performed. In the loading place LPA, a loading machine 3 such as an excavator operates. The discharging place DPA is an area where a discharge operation of discharging the load from the dump truck 2 is performed. For example, a crusher CR is provided in the discharging place DPA.

The management system 1 includes a management apparatus 10 and a communication system 9. The management apparatus 10 includes a computer system and is installed in a control facility 7 provided in the mine. The communication system 9 performs data communication and signal communication between the management apparatus 10 and the dump truck 2. The communication system 9 has a plurality of repeaters 6 that relays data and signals. The management apparatus 10 and the dump truck 2 wirelessly communicate with each other via the communication system 9.

In the present embodiment, the dump truck 2 is an unmanned dump truck traveling through the mine based on a command signal from the management apparatus 10. The dump truck 2 travels through the mine based on the command signal from the management apparatus 10 without depending on the operator's operation.

In the present embodiment, a position of the dump truck 2 is detected using a global navigation satellite system (GNSS). The global navigation satellite system includes a global positioning system (GPS). The GNSS has a plurality of positioning satellites 5. The GNSS detects a position defined by latitude, longitude, and altitude coordinate data. The position detected by the GNSS is an absolute position defined in the global coordinate system. By GNSS, the absolute position of the dump truck 2 at the mine is detected.

[Dump Truck]

Figure 2:
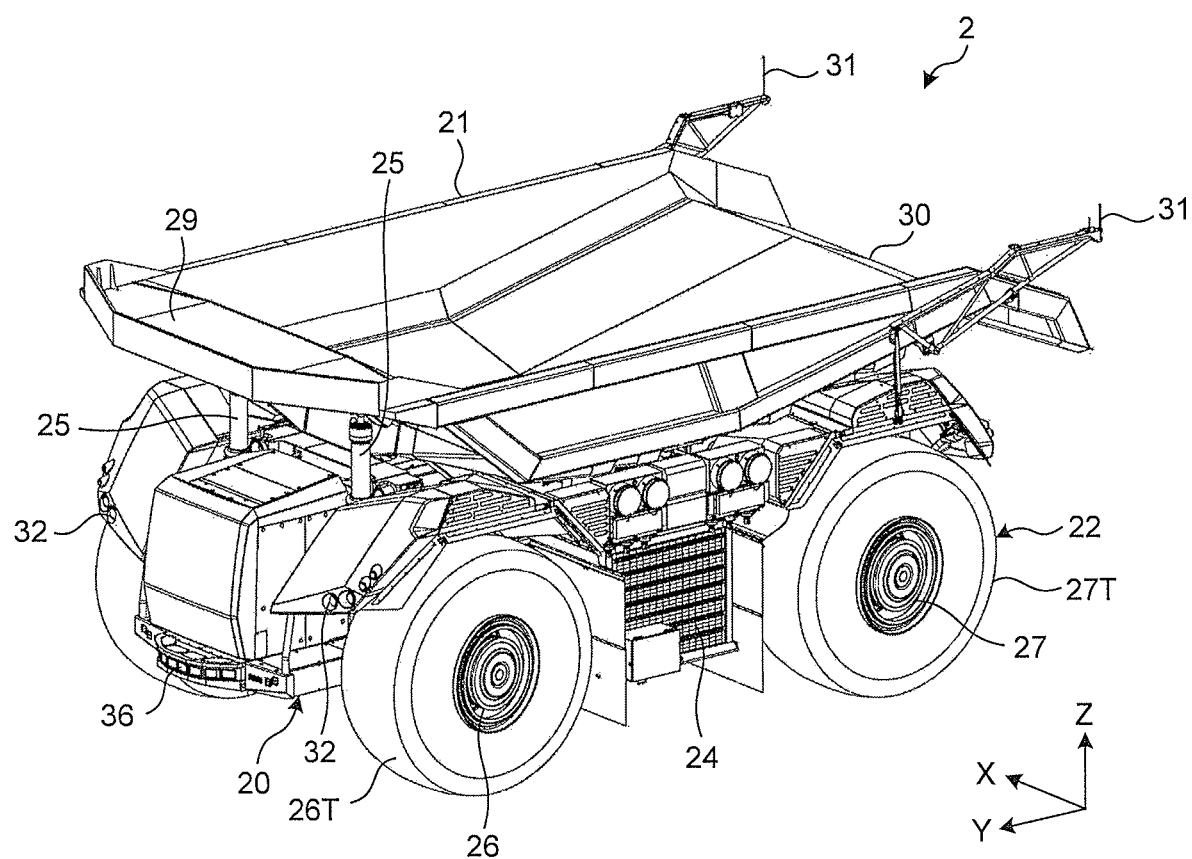
FIG. 2 is a perspective view of the work vehicle according to the present embodiment as viewed from the front.
Figure 3:
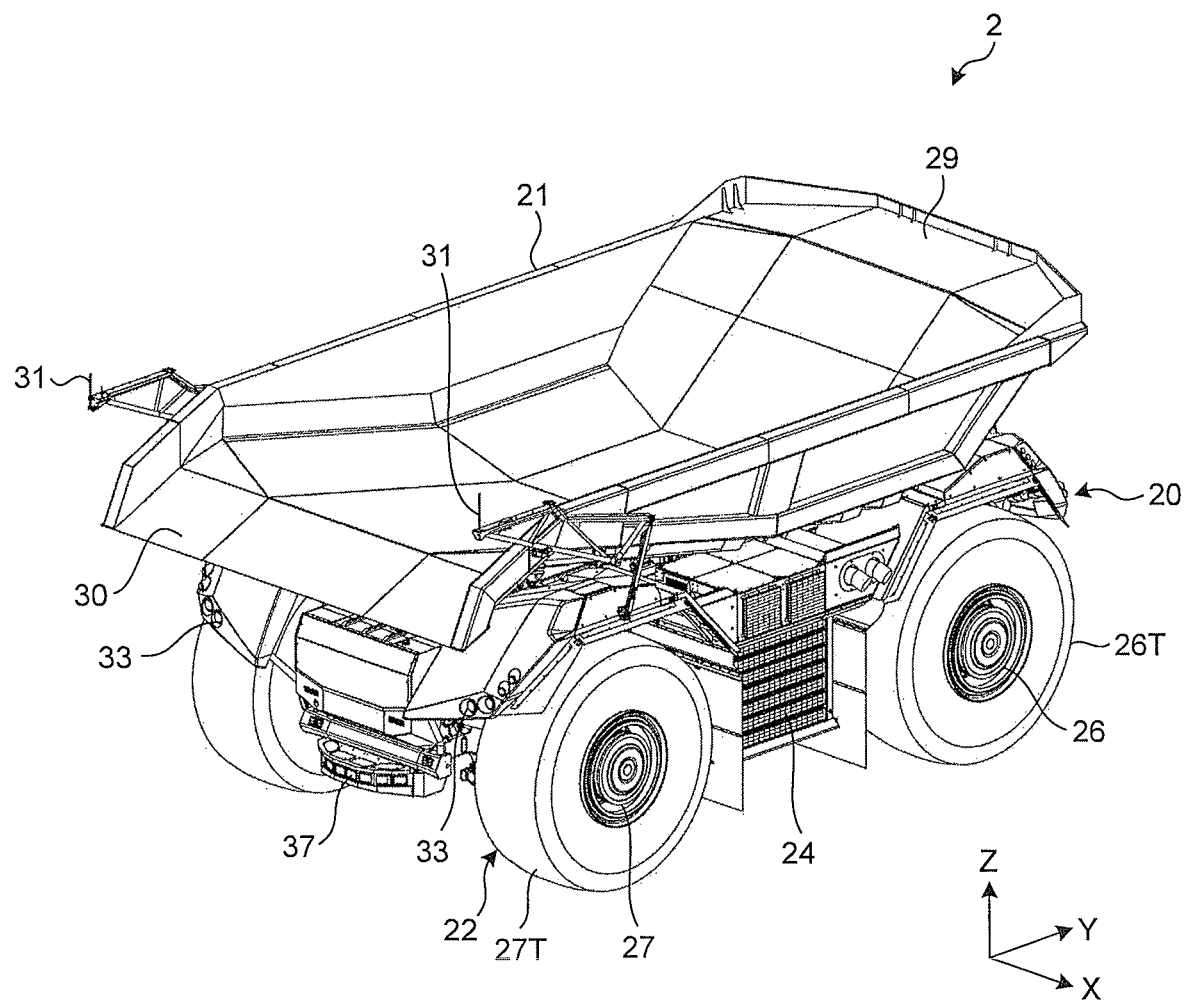
FIG. 3 is a perspective view of the work vehicle according to the present embodiment as viewed from the rear.
Figure 4:
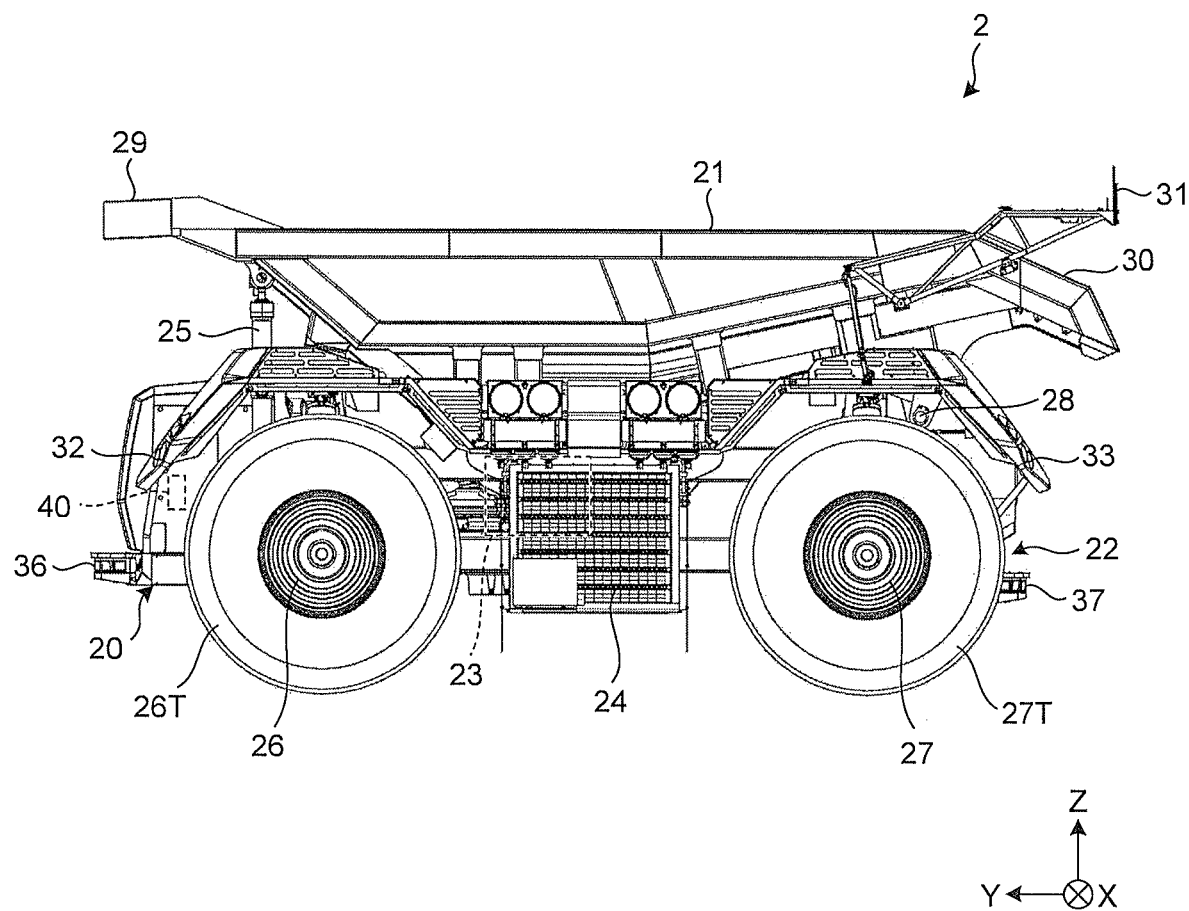
FIG. 4 is a side view illustrating the work vehicle according to the present embodiment.

Next, the dump truck 2 according to the present embodiment will be described. FIG. 2 is a perspective view of the dump truck 2 according to the present embodiment as viewed from the front. FIG. 3 is a perspective view of the dump truck 2 according to the present embodiment as viewed from the rear. FIG. 4 is a side view illustrating the dump truck 2 according to the present embodiment. In explanation using FIGS. 2, 3, and 4, the XYZ orthogonal coordinate system is set and the positional relationship of each part will be described with reference to the XYZ orthogonal coordinate system.

In the explanation using FIGS. 2, 3, and 4, the Y-axis direction is defined as a traveling direction of the dump truck 2, the +Y direction is defined as a forward movement direction of the dump truck 2, and the −Y direction is defined as a backward movement direction of the dump truck 2. Furthermore, in the traveling direction, a portion or a direction on the +Y side of the dump truck 2 is appropriately referred to as a front portion or a front side, and a portion or a direction on the −Y side of the dump truck 2 is appropriately referred to as a rear portion or a rear side. Furthermore, the X-axis direction is defined as a vehicle width direction of the dump truck 2, and in the vehicle width direction, a portion or a direction on the +X side of the dump truck 2 is appropriately referred to as a right portion or a right side, and a portion or a direction on the −X side of the dump truck 2 is appropriately referred to as a left portion or a left side. Furthermore, the Z-axis direction is defined as a longitudinal direction of the dump truck 2, and in the longitudinal direction, a portion or a direction on the +Z side of the dump truck 2 is appropriately referred to as an upper portion or an upper side, and a portion or a direction on the −Z side of the dump truck 2 is appropriately referred to as a lower portion or a lower side.

The dump truck 2 includes a chassis 20, a dump body 21 supported by the chassis 20, a traveling device 22 that supports the chassis 20, a drive device 23 that generates motive power for operating the traveling device 22, a radiator 24, a hoist cylinder 25 that drives the dump body 21, and a control apparatus 40.

In the present embodiment, the dump truck 2 is a cabless dump truck having no cab (operation cab). The dump truck 2 travels unmanned without depending on the operator's operation. The dump truck 2 may be a dump truck having a cab and traveling unmanned.

The traveling device 22 has a wheel 26 provided at the front portion of the dump truck 2 and supporting a tire 26T, a wheel 27 provided at the rear portion of the dump truck 2 and supporting a tire 27T, a brake device configured to brake the wheel 26 and the wheel 27, and a steering device configured to steer the wheel 26 and the wheel 27. One wheel 26 and one tire 26T are provided for each of the right portion and the left portion of the chassis 20. One wheel 27 and one tire 27T are provided for each of the right portion and the left portion of the chassis 20.

The wheel 26 and the wheel 27 are supported by the chassis 20 via a suspension. As the wheel 26 and the wheel 27 rotate, the dump truck 2 travels.

The drive device 23 generates motive power for rotating the wheel 26 and the wheel 27. In the present embodiment, the drive device 23 includes an internal combustion engine, a generator that generates electric power by operation of the internal combustion engine, and an electric motor that operates based on the electric power generated by the generator. The radiator 24 radiates heat from coolant of the internal combustion engine.

The wheel 26 and the wheel 27 are rotated by motive power generated by the electric motor. The electric motor is an in-wheel motor and is provided for each of the wheel 26 and the wheel 27. When the internal combustion engine is driven, the generator operates to generate the electric power. The electric motor is driven by the electric power generated by the generator. The electric motor is provided for each of the two wheels 26. Furthermore, the electric motor is provided for each of the two wheels 27. That is, in the present embodiment, the traveling device 22 is a four-wheel drive type traveling device.

The wheel 26 is steered by a first steering device. The wheel 27 is steered by a second steering device. That is, in the present embodiment, the traveling device 22 is a four-wheel steering type traveling device.

The dump truck 2 is movable forward and backward. It is preferable that the traveling performance of the dump truck 2 at the time of forward movement be substantially identical to the traveling performance of the dump truck 2 at the time of backward movement. That is, at least one of the driving performance, the braking performance, and the swinging performance of the traveling device 22 at the time of forward movement is substantially identical to at least one of the driving performance, the braking performance, and the swinging performance of the traveling device 22 at the time of backward movement. For example, the maximum traveling speed of the dump truck 2 at the time of forward movement is substantially identical to the maximum traveling speed of the dump truck 2 at the time of backward movement. The maximum acceleration of the dump truck 2 at the time of forward movement is substantially identical to the maximum acceleration of the dump truck 2 at the time of backward movement.

In the present embodiment, the forward movement means traveling with the front portion of the dump truck 2 facing the moving direction. In the present embodiment, the backward movement means traveling with the rear portion of the dump truck 2 facing the moving direction.

The dump body 21 accommodates the load. The dump body 21 is rotatably supported at the rear portion of the chassis 20 via a hinge mechanism 28. The dump body 21 has a protrusion 29 at the front portion and an inclined surface 30 at the rear portion.

The hoist cylinder 25 drives the dump body 21. Two hoist cylinders 25 are provided in the vehicle width direction. An upper end of the hoist cylinder 25 is rotatably connected to the front portion of the dump body 21. A lower end of the hoist cylinder 25 is rotatably connected to the chassis 20.

The dump body 21 dumps by the operation of the hoist cylinder 25. As the hoist cylinder 25 extends, the dump body 21 rotates around the hinge mechanism 28 such that the front portion of the dump body 21 rises. As the dump body 21 dumps, the load loaded on the dump body 21 is discharged from the rear portion of the dump body 21.

The control apparatus 40 includes a computer system. The control apparatus 40 controls the dump truck 2 based on a command signal including traveling condition data supplied from the management apparatus 10.

The dump truck 2 has a position detector 31 that detects the absolute position of the dump truck 2, an illumination lamp 32 provided at the front portion, an illumination lamp 33 provided at the rear portion, an obstacle sensor 36 provided at the front portion, and an obstacle sensor 37 provided at the rear portion.

The position detector 31 includes a GPS antenna that receives a GPS signal from the positioning satellite 5 and a GPS calculator that calculates the absolute position of the dump truck 2 based on the GPS signal received by the GPS antenna. The GPS antenna of the position detector 31 is provided at the rear portion of the dump body 21.

The illumination lamp 32 illuminates an object ahead of the dump truck 2. The illumination lamp 33 illuminates an object behind the dump truck 2.

The obstacle sensor 36 detects an obstacle ahead of the dump truck 2 when the dump truck 2 moves forward.

The obstacle sensor 37 detects an obstacle behind the dump truck 2 when the dump truck 2 moves backward. The obstacle sensor 36 and the obstacle sensor 37 include, for example, a radar device. Noted that the obstacle sensor 36 and the obstacle sensor 37 may include a laser scanner or a camera.

When the obstacle sensor 36 detects an obstacle at the time of forward movement of the dump truck 2, the control apparatus 40 performs processing for preventing a collision between the dump truck 2 and the obstacle, based on detection data of the obstacle sensor 36. When the obstacle sensor 37 detects an obstacle at the time of backward movement of the dump truck 2, the control apparatus 40 performs processing for preventing a collision between the dump truck 2 and the obstacle, based on, detection data of the obstacle sensor 37. The processing for preventing a collision between the dump truck 2 and an obstacle is, for example, processing of decelerating or stopping the traveling dump truck 2.

When the dump truck 2 moves forward, the obstacle sensor 36 can detect not only the obstacle ahead of the dump truck 2 but also topographic data ahead of the dump truck 2. When the dump truck 2 moves backward, the obstacle sensor 37 can detect not only the obstacle behind the dump truck 2 but also topographic data behind the dump truck 2. When the dump truck 2 moves forward, using the detection data of the obstacle sensor 37 that is provided at the rear portion of the dump truck 2, processing for preventing a collision between the dump truck 2 and another dump truck 2 behind the dump truck 2 may be performed. When the dump truck 2 moves backward, using the detection data of the obstacle sensor 36 that is provided at the front portion of the dump truck 2, processing for preventing a collision between the dump truck 2 and another dump truck 2 ahead of the dump truck 2 may be performed.

[Management Apparatus and Control Apparatus]

Figure 5:
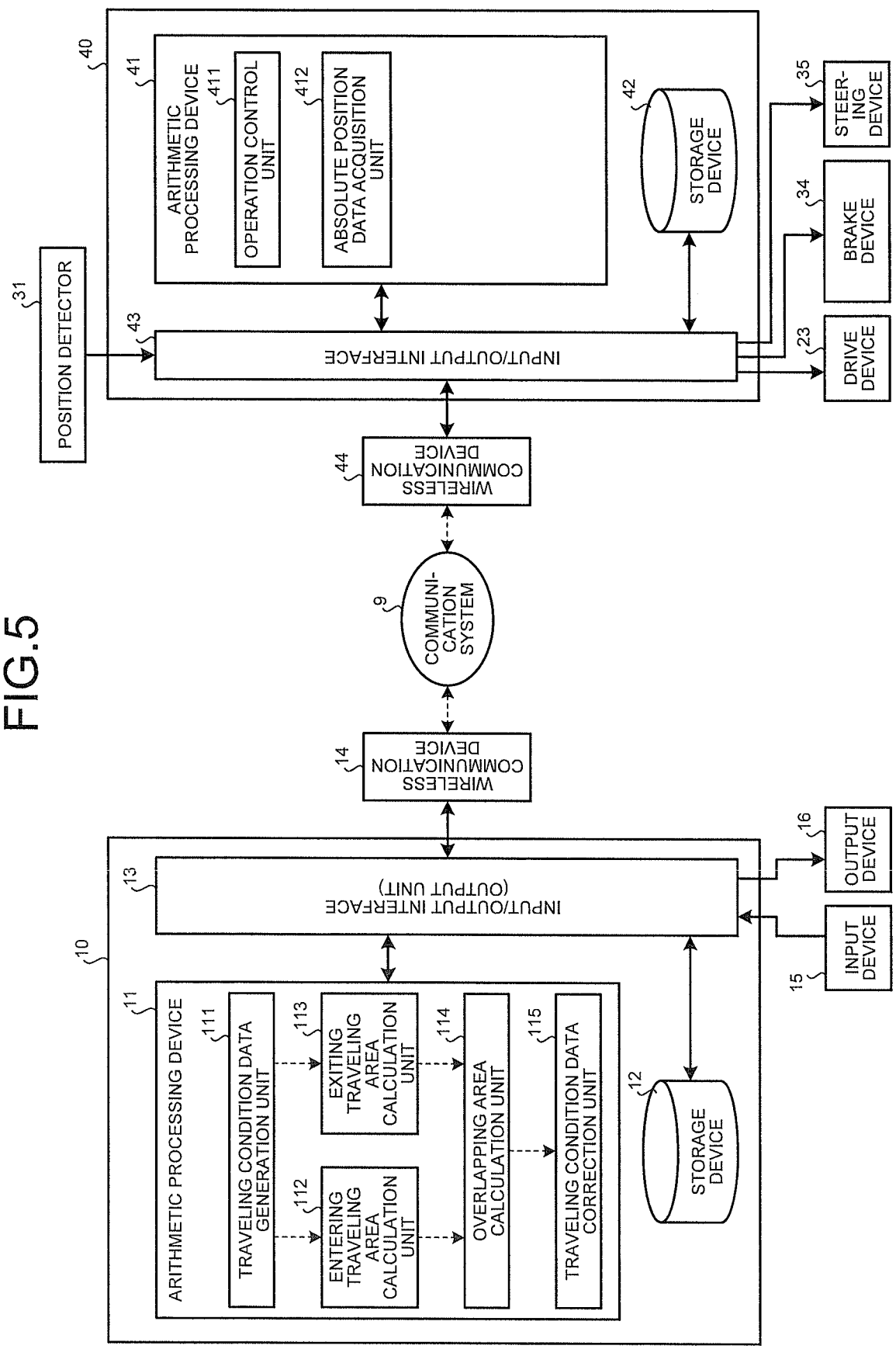
FIG. 5 is a functional block diagram illustrating one example of a management apparatus and a control apparatus according to the present embodiment.

Next, the management apparatus 10 and the control apparatus 40 according to the present embodiment will be described. FIG. 5 is a functional block diagram illustrating one example of the management apparatus 10 and the control apparatus 40 according to the present embodiment. As described above, the management apparatus 10 is installed in the control facility 7. The control apparatus 40 is mounted on the dump truck 2. The management apparatus 10 and the control apparatus 40 wirelessly communicate with each other via the communication system 9.

The management apparatus 10 includes a computer system. The management apparatus 10 has an arithmetic processing device 11 including a processor such as a central processing unit (CPU), a storage device 12 including a memory and storage such as a read only memory (ROM) or a random access memory (RAM), and an input/output interface 13.

The management apparatus 10 is connected to a wireless communication device 14. The management apparatus 10 performs data communication with the dump truck 2 via the wireless communication device 14 and the communication system 9.

The management apparatus 10 is connected to an input device 15 and an output device 16. The input device 15 and the output device 16 are installed in the control facility 7. The input device 15 includes at least one of a keyboard, a mouse, and a touch panel for a computer, for example. The input data generated by operating the input device 15 is output to the management apparatus 10. The output device 16 includes a display device. The display device includes a flat panel display such as a liquid crystal display (LCD) or an organic electroluminescence display (OELD). The output device 16 operates based on the display data output from the management apparatus 10. The output device 16 may be, for example, a printer.

The arithmetic processing device 11 has a traveling condition data generation unit 111, an entering traveling area calculation unit 112, an exiting traveling area calculation unit 113, an overlapping area calculation unit 114, and a traveling condition data correction unit 115.

The traveling condition data generation unit 111 generates traveling condition data of the dump truck 2 traveling through the mine. The traveling condition data of the dump truck 2 includes at least one of a traveling route, a traveling speed, acceleration, deceleration, and a moving direction of the dump truck 2. In addition, the traveling condition data of the dump truck 2 may include at least one of a stopping position and a departure position of the dump truck 2.

In the present embodiment, the traveling condition data generation unit 111, at least, generates the traveling condition data that causes the dump truck 2 to enter with forward movement, from an entrance of the workplace PA to a work point of the workplace PA, and exit with backward movement, from the work point of the workplace PA to an exit of the workplace PA. In the present embodiment, the traveling condition data of the dump truck 2 includes entering route data indicating an entering route of the dump truck 2 from the entrance of the workplace PA to the work point of the workplace PA, and exiting route data indicating an exiting route of the dump truck 2 from the work point of the workplace PA and the exit of the workplace PA.

The traveling condition data generation unit 111 generates the traveling condition data such that the entering route and the exiting route do not overlap with each other in the workplace PA.

Based on the entering route data and outer shape data of the dump truck 2, the entering traveling area calculation unit 112 calculates an entering traveling area indicating an area passed through by the dump truck 2 traveling on the entering route. The outer shape data of the dump truck 2 includes the outer shape and the dimensions of the dump truck 2. The outer shape data of the dump truck 2 is known data and is stored in the storage device 12. Based on the entering route data generated by the traveling condition data generation unit 111 and the outer shape data of the dump truck 2 stored in the storage device 12, the entering traveling area calculation unit 112 calculates the entering traveling area.

Based on the exiting route data and the outer shape data of the dump truck 2, the exiting traveling area calculation unit 113 calculates an exiting traveling area indicating an area passed through by the dump truck 2 traveling on the exiting route. Based on the exiting route data generated by the traveling condition data generation unit 111 and the outer shape data of the dump truck 2 stored in the storage device 12, the exiting traveling area calculation unit 113 calculates the exiting traveling area.

The overlapping area calculation unit 114 calculates an overlapping area between the entering traveling area and the exiting traveling area. Each of the entering traveling area and the exiting area is defined in the global coordinate system. Based on the entering traveling area calculated by the entering traveling area calculation unit 112 and the exiting traveling area calculated by the exiting traveling area calculation unit 113, the overlapping area calculation unit 114 calculates the overlapping area defined in the global coordinate system.

The traveling condition data correction unit 115 corrects the traveling condition data generated by the traveling condition data generation unit 111 such that, when a first dump truck 2A is present in the overlapping area, a second dump truck 2B having entered from the entrance of the workplace PA waits at a standby point outside the overlapping area, and when the first dump truck 2A exits from the overlapping area, the second dump truck 2B waiting at the standby point starts moving.

In the present embodiment, the traveling condition data correction unit 115 corrects the traveling condition data of the first dump truck 2A and the traveling condition data of the second dump truck 2B such that, for example, the sum of a time until the first dump truck 2A exits the overlapping area after finishing work at the work point of the workplace PA and a time until the second dump truck 2B moves from the standby point of the workplace PA to the work point of the workplace PA becomes small.

In the present embodiment, the traveling condition data correction unit 115 corrects the entering route data and the exiting route data such that the overlapping area becomes small.

The input/output interface 13 outputs the traveling condition data generated by the traveling condition data generation unit 111 to the dump truck 2. Furthermore, the input/output interface 13 outputs the traveling condition data corrected by the traveling condition data correction unit 115 to the dump truck 2; in the present embodiment, the input/output interface 13 functions as an output unit that outputs the traveling condition data to the dump truck 2. The traveling condition data generated by the arithmetic processing device 11 is output to the dump truck 2 via the input/output interface 13 and the communication system 9.

The control apparatus 40 includes the computer system. The control apparatus 40 has an arithmetic processing device 41 including a processor such as a central processing unit (CPU), a storage device 42 including a memory and storage such as a read only memory (ROM) or a random access memory (RAM), and an input/output interface 43.

The control apparatus 40 is connected to a wireless communication device 44. The control apparatus 40 performs data communication with the management apparatus 10 via the wireless communication device 44 and the communication system 9.

The control apparatus 40 is connected to the position detector 31, the drive device 23, a brake device 34, and a steering device 35. The position detector 31, the drive device 23, the brake device 34, and the steering device 35 are mounted on the dump truck 2.

As described above, the position detector 31 detects the absolute position of the dump truck 2. The drive device 23 operates in order to drive the traveling device 22 of the dump truck 2. The brake device 34 operates in order to brake the traveling device 22 of the dump truck 2. The steering device 35 operates in order to steer the traveling device 22 of the dump truck 2.

The arithmetic processing device 41 has an operation control unit 411 and an absolute position data acquisition unit 412.

The operation control unit 411 outputs an operation control signal for controlling at least one of the drive device 23, the brake device 34, and the steering device 35 of the dump truck 2, based on the traveling condition data supplied from the management apparatus 10. The operation control signal includes an accelerator command signal output to the drive device 23, a brake command signal output to the brake device 34, and a steering command signal output to the steering device 35.

The absolute position data acquisition unit 412 acquires the absolute position data of the dump truck 2 from the detection data of the position detector 31.

[Traveling Condition Data]

Figure 6:
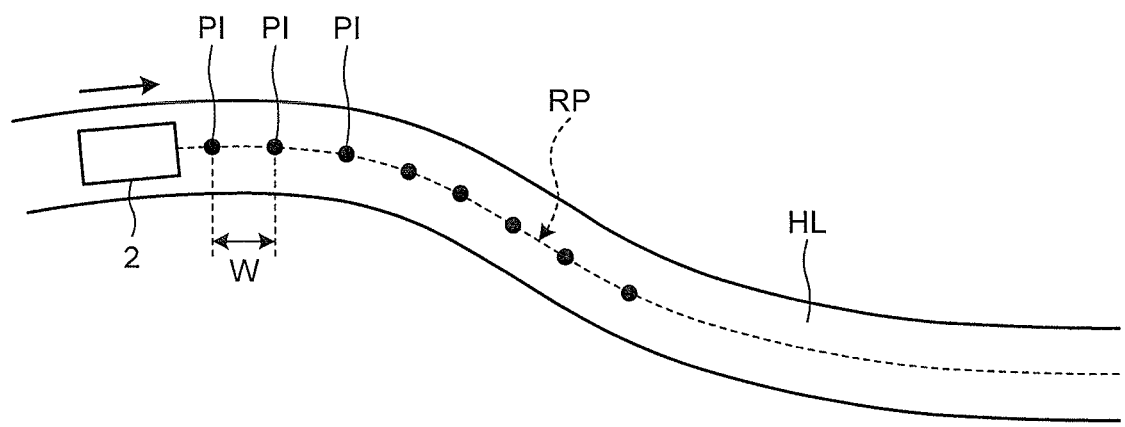
FIG. 6 is a diagram schematically illustrating traveling condition data according to the present embodiment.

Next, the traveling condition data according to the present embodiment will be described. FIG. 6 is a diagram schematically illustrating the traveling condition data according to the present embodiment. FIG. 6 illustrates one example of the traveling condition data defined in the conveying path HL.

As illustrated in FIG. 6, the traveling condition data includes an aggregate of a plurality of course points PI set at a constant interval W.

Each of the plurality of course points PI includes target absolute position data of the dump truck 2, target traveling speed data of the dump truck 2 at the position where the course point PI is set, and target moving direction data of the dump truck 2 at the position where the course point PI is set.

A target traveling route RP of the dump truck 2 is defined by a trajectory passing through the plurality of course points PI. The target traveling speed of the dump truck 2 at the position where the course point PI is set is defined based on the target traveling speed data. The target moving direction of the dump truck 2 at the position where the course point PI is set is defined based on the target moving direction data.

FIG. 6 illustrates one example of the traveling condition data set in the conveying path HL. In the workplace PA, the traveling condition data of the dump truck 2 is also set.

[Management Method]

Figure 7:
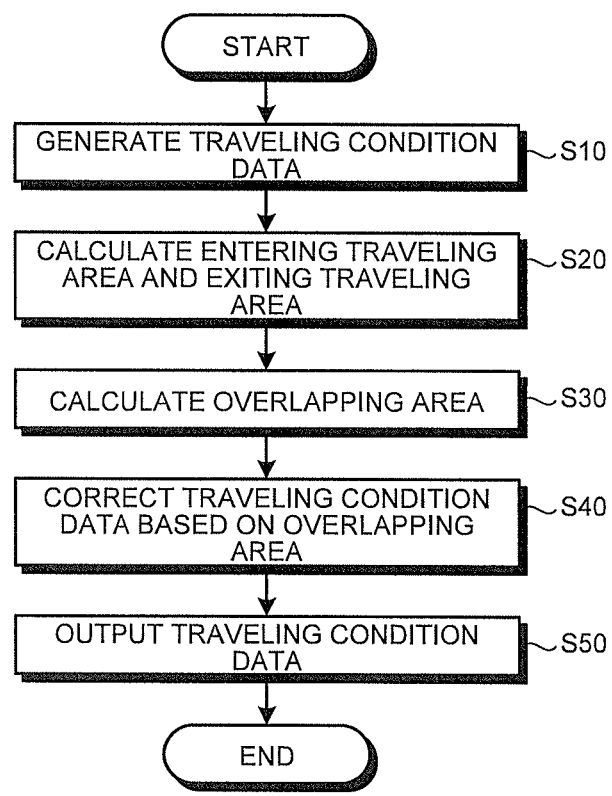
FIG. 7 is a flowchart illustrating one example of a management method for a work vehicle according to the present embodiment.
Figure 8:
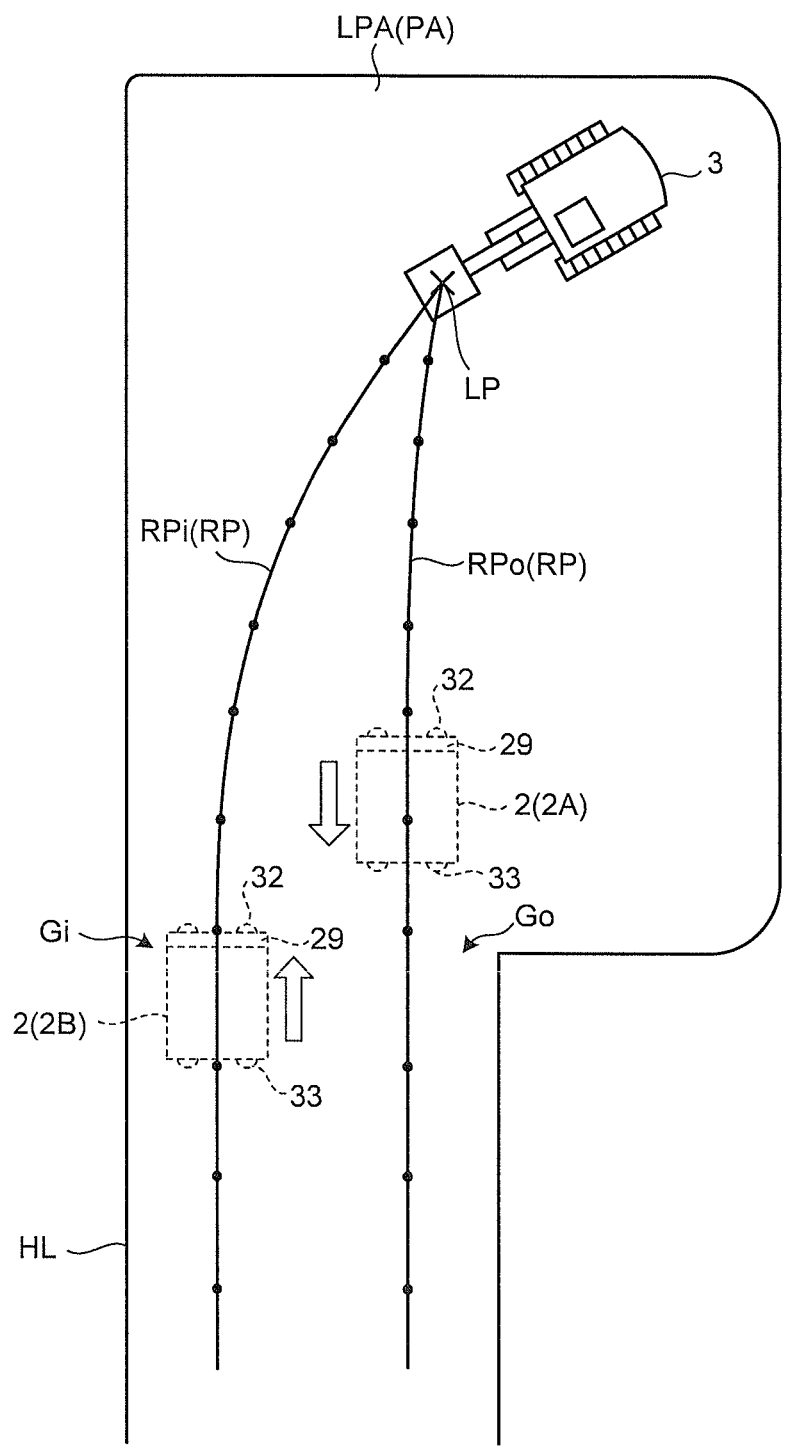
FIG. 8 is a schematic diagram for explaining the management method for a work vehicle according to the present embodiment.
Figure 9:
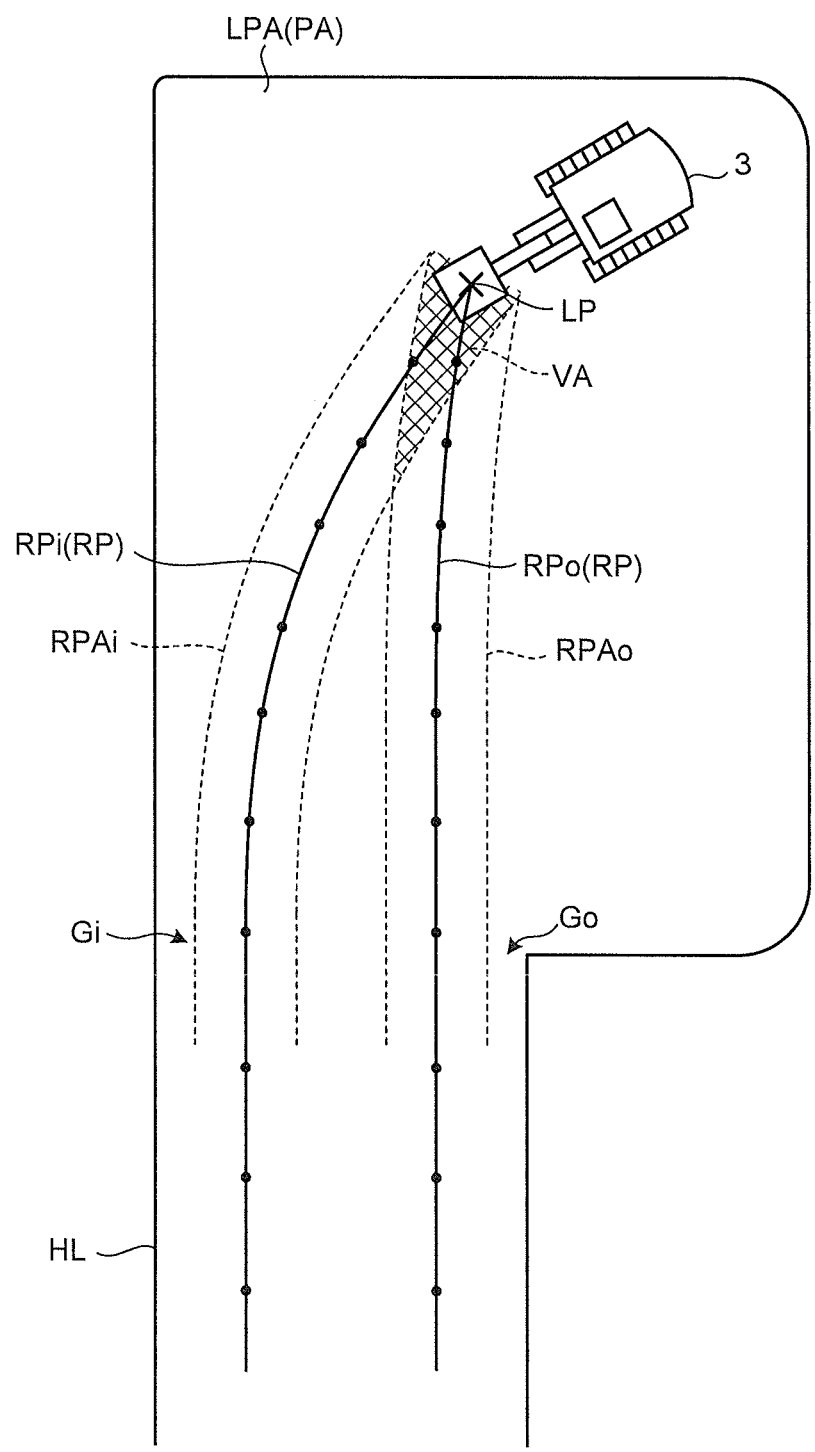
FIG. 9 is a schematic diagram for explaining the management method for a work vehicle according to the present embodiment.
Figure 10:
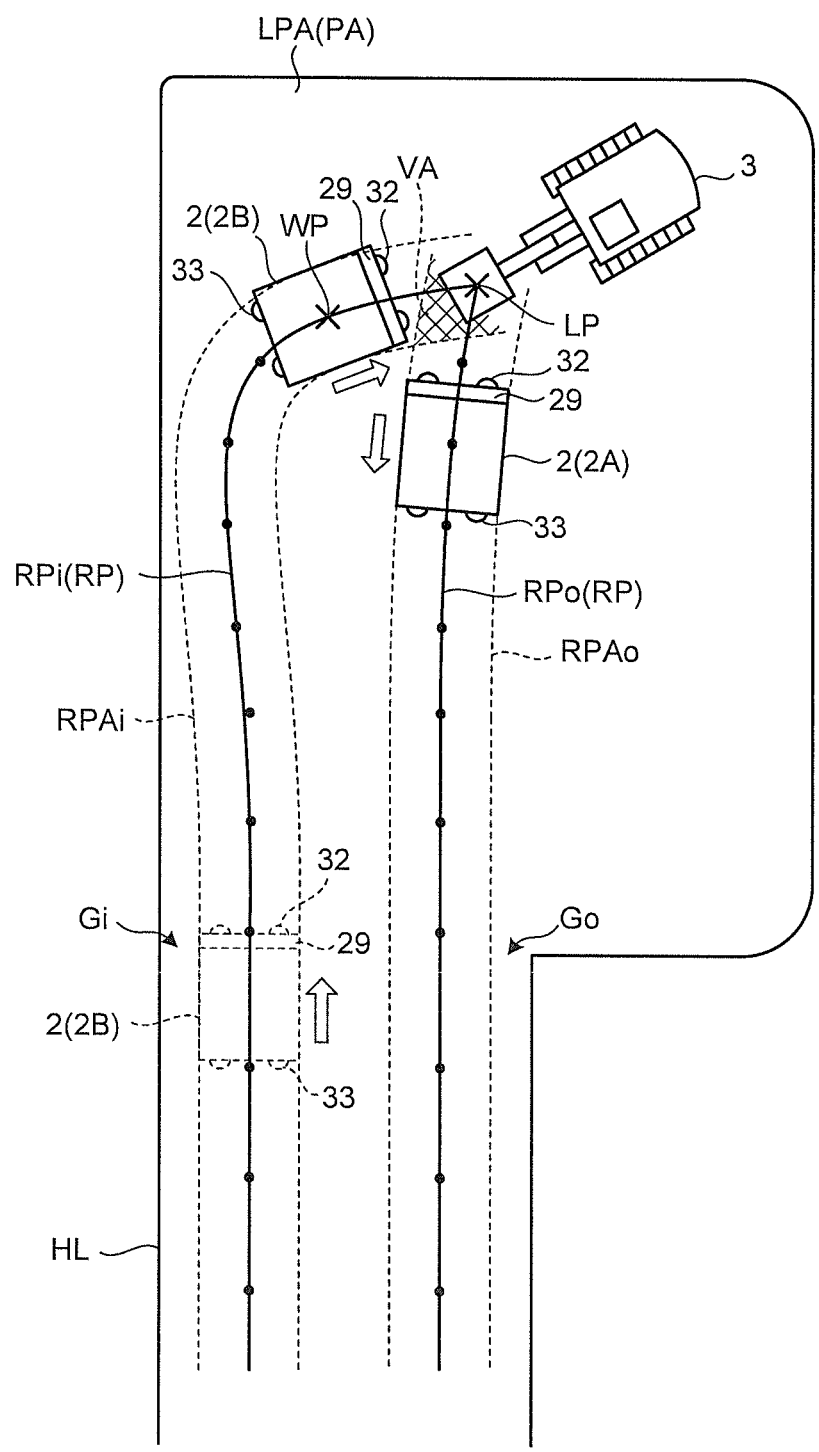
FIG. 10 is a schematic diagram for explaining the management method for a work vehicle according to the present embodiment.

Next, a management method for the dump truck 2 according to the present embodiment will be described. FIG. 7 is a flowchart illustrating one example of the management method for the dump truck 2 according to the present embodiment. FIGS. 8, 9, and 10 are schematic diagrams for explaining the management method for the dump truck 2 according to the present embodiment.

In the following explanation, the management method for the dump truck 2 in the loading place LPA of the workplace PA will be described. The work point of the loading place LPA is a loading point LP indicating a position where a loading operation is performed by the loading machine 3. In a case where the loading machine 3 is an excavator having an upper swing body and a work machine supported by the upper swing body, the loading point LP is defined in a swing range of the work machine.

The traveling condition data generation unit 111 generates the traveling condition data of the dump truck 2 in the loading place LPA (step S10).

FIG. 8 illustrates one example of the traveling condition data set in the loading place LPA according to the present embodiment. As illustrated in FIG. 8, an entrance Gi and an exit Go are defined in the loading place LPA. The dump truck 2 having traveled on the conveying path HL enters the loading place LPA from the entrance Gi. The dump truck 2B having entered from the entrance Gi to the loading place LPA moves toward the loading point LP as the work point and stops at the loading point LP. The dump truck 2A loaded with the load at the loading point LP moves toward the exit Go and exits from the exit Go to the conveying path HL.

As described above, in the present embodiment, the traveling performance of the dump truck 2 at the time of forward movement is substantially identical to the traveling performance of the dump truck 2 at the time of backward movement. In the present embodiment, the traveling condition data generation unit 111 generates the traveling condition data that causes the dump truck 2 to enter with forward movement, from the entrance Gi of the loading place LPA to the loading point LP of the loading place LPA, and exit with backward movement, from the loading point LP to the exit Go of the loading place LPA. As illustrated in FIG. 8, based on the traveling condition data, the dump truck 2 enters with forward movement, from the entrance Gi to the loading point LP. After the loading operation is complete at the loading point LP, based on the traveling condition data, the dump truck 2 exits with backward movement, from the loading point LP to the exit Go.

A target traveling route RP set in the loading place LPA includes an entering route RPi of the dump truck 2 from the entrance Gi to the loading point LP and an exiting route RPo of the dump truck 2 from the loading point LP to the exit Go. As illustrated in FIG. 8, in the present embodiment, the traveling condition data generation unit 111 generates the traveling condition data such that the entering route RPi and the exiting route RPo do not overlap with each other in the loading place LPA.

Next, based on the entering route data indicating the entering route RPi and the outer shape data of the dump truck 2, the entering traveling area calculation unit 112 calculates an entering traveling area RPAi indicating an area passed through by the dump truck 2 traveling on the entering route RPi. Furthermore, based on the exiting route data indicating the exiting route RPo and the outer shape data of the dump truck 2, the exiting traveling area calculation unit 113 calculates an exiting traveling area RPAo indicating an area passed through by the dump truck 2 traveling on the exiting route RPo (step S20).

FIG. 9 illustrates one example of the entering traveling area RPAi and the exiting traveling area RPAo according to the present embodiment. The width dimension of the entering traveling area RPAi and the width dimension of the exiting traveling area RPAo are substantially identical to the vehicle width dimension of the dump truck 2, for example. The entering traveling area calculation unit 112 calculates the entering traveling area RPAi, based on the entering route data indicating the entering route RPi and the outer shape data including the vehicle width dimension of the dump truck 2. The exiting traveling area calculation unit 113 calculates the exiting traveling area RPAo, based on the exiting route data indicating the exiting route RPo and the outer shape data including the vehicle width dimension of the dump truck 2. The width dimension of the entering traveling area RPAi and the width dimension of the exiting traveling area RPAo may not be the same as the vehicle width dimension of the dump truck 2 and may be larger than the vehicle width dimension of the dump truck 2.

Next, the overlapping area calculation unit 114 calculates an overlapping area VA between the entering traveling area RPAi and the exiting traveling area RPAo (step S30).

Each of the entering traveling area RPAi and the exiting area RPAo is defined in the global coordinate system. The overlapping area calculation unit 114 calculates the overlapping area VA defined in the global coordinate system, based on the entering traveling area RPAi and the exiting traveling area RPAo.

As illustrated in FIG. 9, the overlapping area VA includes the loading point LP. The size of the overlapping area VA changes based on a relative position between the entering route RPi and the exiting route RPo.

Next, the traveling condition data correction unit 115 corrects the traveling condition data, based on the overlapping area VA (step S40).

In the loading place LPA, a plurality of dump trucks 2 is sequentially provided at the loading point LP, and the loading operation for the dump trucks 2 provided at the loading point LP is sequentially performed. For example, if the next dump truck 2B enters the overlapping area VA while the previous dump truck 2A is present in the loading point LP, the dump truck 2A and the dump truck 2B come into contact with each other. That is, in the case where the plurality of dump trucks 2 is present in the overlapping area VA, the dump trucks 2 come in contact with each other. Therefore, the traveling condition data correction unit 115 corrects each of the traveling condition data of the plurality of dump trucks 2 such that only one dump truck 2 is present in the overlapping area VA, in other words, such that the plurality of dump trucks 2 is not present in the overlapping area VA.

In the present embodiment, the traveling condition data correction unit 115 corrects the traveling condition data of the dump truck 2 such that, when the previous dump truck 2A is present in the overlapping area VA, the next dump truck 2B having entered from the entrance Gi to the loading place LPA waits at a standby point WP outside the overlapping area VA, and when the previous dump truck 2A exits from the overlapping area VA, the next dump truck 2B waiting at the standby point WP starts moving to the loading point LP.

In order to improve the productivity of the mine, it is necessary to shorten the non-operating time of the loading machine 3. Therefore, it is preferable that the previous dump truck 2A having finished the loading operation at the loading point LP quickly exit from the overlapping area VA, and the next dump truck 2B quickly move from the standby point WP to the loading point LP.

In other words, in order to improve the productivity of the mine, it is preferable that the traveling condition data of the previous dump truck 2A and the traveling condition data of the next dump truck 2B be set such that a time To until the previous dump truck 2A exits the overlapping area VA after finishing the loading operation at the loading point LP and a time Ti until the next dump truck 2B moves from the standby point WP to the loading point LP becomes small.

As a measure for reducing the sum of the time To and the time Ti, the overlapping area VA can be reduced. As the overlapping area VA becomes small, a moving distance until the previous dump truck 2A exits the overlapping area VA is shortened, and the time To is shortened. In addition, as the overlapping area VA becomes small, a distance between the standby point WP and the loading point LP is shortened, the moving distance of the next dump truck 2B is shortened, and the time Ti is shortened.

Furthermore, as a measure for reducing the sum of the time To and the time Ti, at least one of the traveling speed of the previous dump truck 2A and the traveling speed of the next dump truck 2B can be increased. As the traveling speed of the previous dump truck 2A exiting from the loading point LP is increased, the time To until the previous dump truck 2A exits the overlapping area VA is shortened. As the traveling speed of the next dump truck 2B entering the loading point LP is increased, the time Ti is shortened. In the present embodiment, since the traveling performance of the dump truck 2 at the time of forward movement is substantially identical to the traveling performance of the dump truck 2 at the time of backward movement, it is possible to increase both of the traveling speed when the previous dump truck 2A exits from the loading point LP and the traveling speed when the next dump truck 2 enters the loading point LP. Therefore, the management system 1 can shorten the time To and the time Ti.

The input/output interface 13 outputs the traveling condition data corrected by the traveling condition data correction unit 115 to the dump truck 2 (step S50). The dump truck 2 travels based on the traveling condition data output from the traveling condition data correction unit 115.

FIG. 10 illustrates one example of the dump truck 2 that travels based on the traveling condition data according to the present embodiment. As illustrated in FIG. 10, in the loading place LPA, the loading point LP and the standby point WP are set. The entering route data and the exiting route data are set such that the entering route RPi and the exiting route RPo do not intersect with each other in the loading place LPA. The standby point WP is set outside the overlapping area VA.

In addition, the entering route data and the exiting route data are set such that the overlapping area VA becomes small. In the example illustrated in FIG. 10, the entering route data is set such that the entering route RPi bypasses the exiting route RPo near the loading point LP, as compared with the examples illustrated in FIGS. 8 and 9.

The next dump truck 2B enters with forward movement, from the entrance Gi to the standby point WP. The previous dump truck 2A having finished the loading operation in the loading place LPA exits with backward movement, from the loading point LP to the exit Go. The next dump truck 2B waiting at the standby point WP starts moving to the loading point LP when the previous dump truck 2A exits from the overlapping area VA. The next dump truck 2B enters with forward movement, from the standby point WP to the loading point LP. The next dump truck 2B having finished the loading operation in the loading place LP exits with backward movement, from the loading point LP to the exit Go.

In the present embodiment, the traveling condition data correction unit 115 reduces the overlapping area VA, thereby reducing the sum of the time To and the time Ti. The traveling condition data correction unit 115 may not correct the entering route data and the exiting route data such that the overlapping area VA becomes small. For example, the traveling condition data correction unit 115 may reduce the sum of the time To and the time Ti by increasing the traveling speed of the previous dump truck 2A and the traveling speed of the next dump truck 2B. When increasing the traveling speed of the dump truck 2, it is preferable to reduce the curvature of the curves of the entering route RPi and the exiting route RPo. If the curvature of the curves is reduced, there is a possibility that the overlapping area VA may become large, but as the traveling speed of the dump truck 2 increases, the sum of the time To and the time Ti becomes small.

In the present embodiment, as one example of the management method for the dump truck 2 in the workplace PA, the management method for the dump truck 2 in the loading place LPA has been described. The above management method is also applicable to the dump truck 2 in the discharging place DPA. In the discharging place DPA, the plurality of dump trucks 2 sequentially travels to a discharging point DP as the work point, and the discharge operation is sequentially performed. In the discharging place DPA, the dump truck 2 enters with backward movement, from the entrance Gi of the discharging place DPA to the discharging point DP of the discharging place DPA, and exits with forward movement, from the discharging point DP to the exit Go of the discharging place DPA. Even in the discharging place DPA, the traveling condition data is generated such that the entering route RPi and the exiting route RPo do not overlap with each other. In addition, even in the discharging place DPA, the entering traveling area RPAi is calculated based on the entering route data and the outer shape data of the dump truck 2, and the exiting traveling area RPAo is calculated based on the exiting route data and the outer shape data of the dump truck 2, and the overlapping area VA between the entering traveling area RPAi and the exiting traveling area RPAo is calculated. Furthermore, even in the discharging place DPA, the next dump truck 2B waits at the standby point WP outside the overlapping area VA, and the next dump truck 2B waiting at the standby point WP starts moving to the discharging point DP when the previous dump truck 2A exits from the overlapping area VA. The traveling condition data of the previous dump truck 2A and the traveling condition data of the next dump truck 2B are set such that the time To until the previous dump truck 2A exits the overlapping area VA after finishing the work at the discharging point DP and the time Ti until the next dump truck 2B moves from the standby point WP to the discharging point DP becomes small.

[Action and Effect]

As described above, according to the present embodiment, the dump truck 2 where the traveling performance at the time of forward movement is substantially identical to the traveling performance at the time of backward movement can enter with forward movement, from the entrance Gi of the workplace PA to the work point of the workplace PA, and exit with backward movement, from the work point to the exit Go of the workplace PA. The management apparatus 10 generates the traveling condition data that causes the dump truck 2 to enter with forward movement, from the entrance Gi of the workplace PA to the work point of the workplace PA, and exit with backward movement, from the work point to the exit Go of the workplace PA, and then outputs the traveling condition data to the dump truck 2. As a result, the switchback operation of the dump truck 2 in the workplace PA is omitted. Therefore, the cycle time of the dump truck 2 is shortened, and the productivity of the mine is improved. In addition, by omitting the switchback operation, occurrence of uneven wear in the tire 26T and the tire 27T is suppressed, and the life of the tire 26T and the tire 27T is improved.

Furthermore, according to the present embodiment, the traveling condition data generation unit 111 generates the traveling condition data such that the entering route RPi and the exiting route RPo do not overlap with each other in the workplace PA. As a result, interference between the previous dump truck 2A that travels from the work point to the exit Go and the next dump truck 2B that travels from the entrance Gi to the work point is suppressed, and the dump trucks 2 can travel smoothly.

Figure 11:
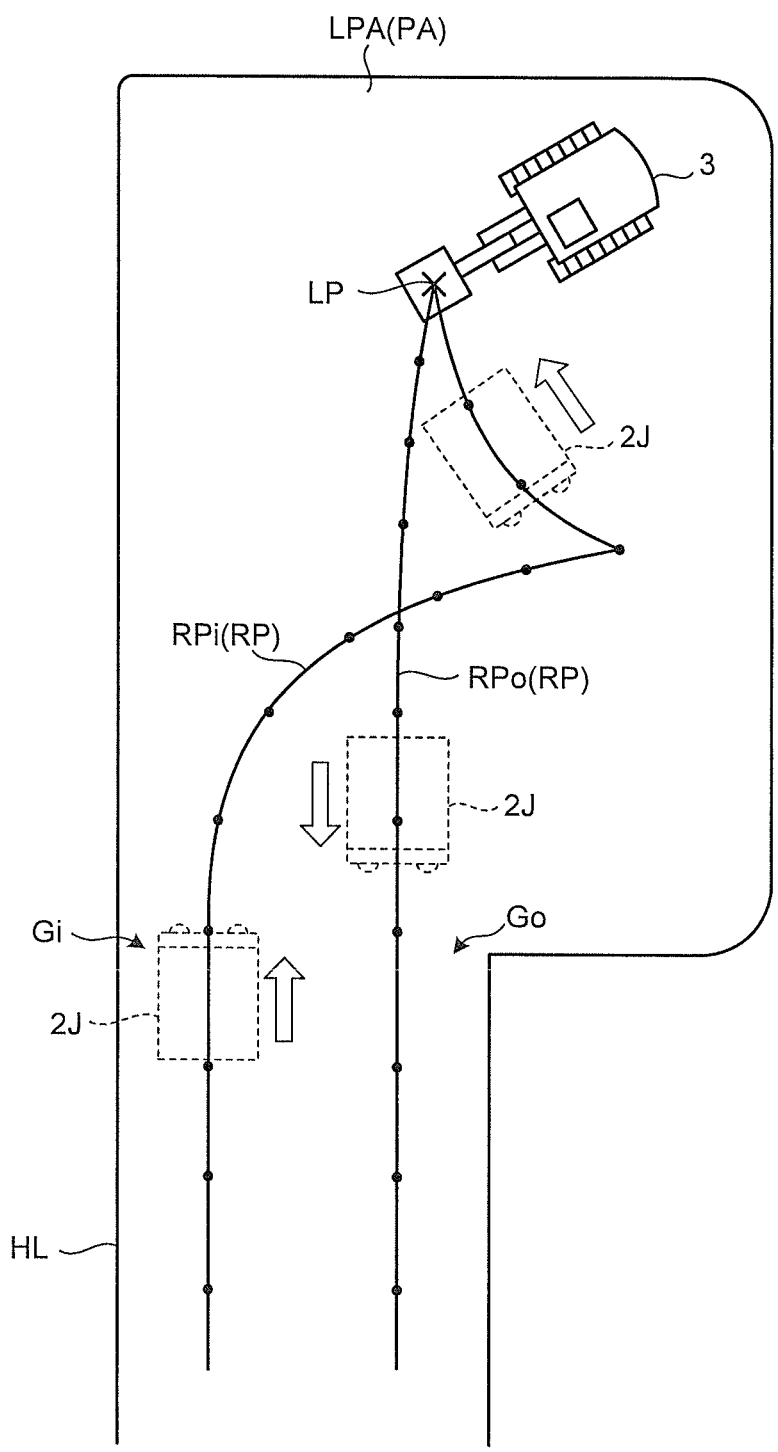
FIG. 11 is a schematic diagram for explaining a management method for a work vehicle according to a conventional example.

FIG. 11 is a schematic diagram for explaining a management method for a dump truck 2J according to a conventional example. As illustrated in FIG. 11, in the conventional example, switchback operation of the dump truck 2J is performed in the workplace PA. As illustrated in FIG. 11, in the conventional example, the switchback operation is an operation in which the dump truck 2J moving forward changes its moving direction to start moving backward. For example, in a case where the loading place LPA is narrow, in order to cause the dump truck 2J to perform the switchback operation, it is necessary to set traveling condition data such that the entering route RPi and the exiting route RPo intersect with each other. In this case, there is a possibility that the previous dump truck 2J that travels from the work point to the exit Go may interfere with the next dump truck 2J that travels from the entrance Gi to the work point, and the dump trucks 2J are difficult to smoothly travel.

In the present embodiment, the traveling condition data generation unit 111 generates the traveling condition data such that the entering route RPi and the exiting route RPo do not intersect with each other at the workplace PA. As a result, interference between the previous dump truck 2A that travels from the work point to the exit Go and the next dump truck 2B that travels from the entrance Gi to the work point is suppressed, and the dump trucks 2 can travel smoothly.

Furthermore, in the present embodiment, the entering traveling area RPAi and the exiting traveling area RPAo are calculated, and the overlapping area VA between the entering traveling area RPAi and the exiting traveling area RPAo is calculated. Based on the overlapping area VA, the management apparatus 10 sets the traveling condition data such that, when the previous dump truck 2A is present in the overlapping area VA, the next dump truck 2B waits at the standby point WP outside the overlapping area VA, and when the previous dump truck 2A exits from the overlapping area VA, the next dump truck 2B waiting at the standby point WP starts moving to the work point. As a result, the non-operating time of the loading machine 3 is shortened while preventing the contact between the previous dump truck 2A and the next dump truck 2B. Therefore, the productivity of the mine is dramatically improved.

Furthermore, in the present embodiment, the traveling condition data of the dump truck 2 is set such that the sum of the time To until the previous dump truck 2A exits the overlapping area VA after finishing the work at the work point and the time Ti until the next dump truck 2B moves from the standby point WP to the work point becomes small. As a result, the non-operating time of the loading machine 3 is effectively shortened, and the productivity of the mine is dramatically improved.

In the above embodiment, the functions of the traveling condition data generation unit 111, the entering traveling area calculation unit 112, the exiting traveling area calculation unit 113, the overlapping area calculation unit 114, and the traveling condition data correction unit 115 are included in the management apparatus 10. Part or all of the functions of the traveling condition data generation unit 111, the entering traveling area calculation unit 112, the exiting traveling area calculation unit 113, the overlapping area calculation unit 114, and the traveling condition data correction unit 115 may be included in the control apparatus 40 mounted on the dump truck 2.

In the above embodiment, it is assumed that the work vehicle is the dump truck 2 operating in the mine. The work vehicle may operate in a wide-area work site separate from the mine.

REFERENCE SIGNS LIST

1 MANAGEMENT SYSTEM
2 DUMP TRUCK (WORK VEHICLE)
3 LOADING MACHINE
5 POSITIONING SATELLITE
6 REPEATER
7 CONTROL FACILITY
9 COMMUNICATION SYSTEM
10 MANAGEMENT APPARATUS
11 ARITHMETIC PROCESSING DEVICE
12 STORAGE DEVICE
13 INPUT/OUTPUT INTERFACE
14 WIRELESS COMMUNICATION DEVICE
15 INPUT DEVICE
16 OUTPUT DEVICE
20 CHASSIS
21 DUMP BODY
22 TRAVELING DEVICE
23 DRIVE DEVICE
24 RADIATOR
25 HOIST CYLINDER
26 WHEEL
26T TIRE
27 WHEEL
27T TIRE
28 HINGE MECHANISM
29 PROTRUSION
30 INCLINED SURFACE
31 POSITION DETECTOR
32 ILLUMINATION LAMP
33 ILLUMINATION LAMP
34 BRAKE DEVICE
35 STEERING DEVICE
36 OBSTACLE SENSOR
37 OBSTACLE SENSOR
40 CONTROL APPARATUS
41 ARITHMETIC PROCESSING DEVICE
42 STORAGE DEVICE
43 INPUT/OUTPUT INTERFACE
44 WIRELESS COMMUNICATION DEVICE
111 TRAVELING CONDITION DATA GENERATION UNIT
112 ENTERING TRAVELING AREA CALCULATION UNIT
113 EXITING TRAVELING AREA CALCULATION UNIT
114 OVERLAPPING AREA CALCULATION UNIT
115 TRAVELING CONDITION DATA CORRECTION UNIT
411 OPERATION CONTROL UNIT
412 ABSOLUTE POSITION DATA ACQUISITION UNIT
CR CRUSHER
DPA DISCHARGING PLACE
GI ENTRANCE
GO EXIT
HL CONVEYING PATH
IS INTERSECTION
LPA LOADING PLACE
PA WORKPLACE
RP TARGET TRAVELING ROUTE
RPI ENTERING ROUTE
RPAI ENTERING TRAVELING AREA
RPO EXITING ROUTE
RPAO EXITING TRAVELING AREA
VA OVERLAPPING AREA

The invention claimed is:

1. A management system for a transport vehicle, comprising:
at least one processor configured to:

generate entering route data that causes a transport vehicle including a dump body to enter with forward movement, through a route from an entrance of a loading place to a loading point of the loading place, and exiting route data that causes the transport vehicle to exit with backward movement, through a route from the loading point to an exit of the loading place, a load being discharged from a rear portion of the dump body, and the loading point indicating a position where a loading operation is performed by a loading machine; and output the entering route data and the exiting route data to the transport vehicle, wherein the at least one processor is further configured to:
calculate an entering traveling area indicating an area passed through by the transport vehicle that travels on the entering route, based on the entering route data and an outer shape of the transport vehicle;
calculate an exiting traveling area indicating an area passed through by the transport vehicle that travels on the exiting route, based on the exiting route data and the outer shape data of the transport vehicle;
calculate an overlapping area between the entering traveling area and the exiting traveling area; and
correct the entering route data and the exiting route data such that, when a first transport vehicle is present in the overlapping area, a second transport vehicle having entered from the entrance waits at a standby point outside the overlapping area, and when the first transport vehicle exits from the overlapping area, the second transport vehicle waiting at the standby point starts moving.

2. The management system for a work vehicle according to claim 1,
wherein the transport vehicle has an obstacle sensor at each of a front portion and a rear portion, and is configured to detect an obstacle at the time of forward movement and at the time of backward movement.

3. The management system for a work vehicle according to claim 1,
wherein the at least one processor is configured to correct the entering route data and the exiting route data of the first transport vehicle and the entering route data and the exiting route data of the second transport vehicle such that a sum of a time until the first transport vehicle exits the overlapping area after finishing work at the work point and a time until the second transport vehicle moves from the standby point to the work point becomes small.

4. The management system for a work vehicle according to claim 1,
wherein the at least one processor is configured to correct the entering route data and the exiting route data such that the overlapping area becomes small.

5. A management method for a transport vehicle, comprising:
generating entering route data that causes a transport vehicle including a dump body to enter with forward movement, through a route from an entrance of a loading place to a loading point of the loading place, and exiting route data that causes the transport vehicle to exit with backward movement, through a route from the loading point to an exit of the loading place, a load being discharged from a rear portion of the dump body, and the loading point indicating a position where a loading operation is performed by a loading machine; and outputting the entering route data and the exiting route data to the transport vehicle, wherein the method further comprises:
calculating an entering traveling area indicating an area passed through by the transport vehicle that travels on the entering route, based on the entering route data and an outer shape of the transport vehicle;
calculating an exiting traveling area indicating an area passed through by the transport vehicle that travels on the exiting route, based on the exiting route data and the outer shape data of the transport vehicle;
calculating an overlapping area between the entering traveling area and the exiting traveling area; and
correcting the entering route data and the exiting route data such that, when a first transport vehicle is present in the overlapping area, a second transport vehicle having entered from the entrance waits at a standby point outside the overlapping area, and when the first transport vehicle exits from the overlapping area, the second transport vehicle waiting at the standby point starts moving.

* * * * *